(12) United States Patent
Brown et al.

(10) Patent No.: US 6,753,365 B2
(45) Date of Patent: Jun. 22, 2004

(54) POLYETHERIMIDE COMPOSITION, METHOD, AND ARTICLE

(75) Inventors: Sterling Bruce Brown, Niskayuna, NY (US); Jennifer L. David, Clifton Park, NY (US); Robert Russell Gallucci, Mt. Vernon, IN (US); Yimin Jin, Glenmont, NY (US); Martin J. Lindway, Newburgh, IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/683,805

(22) Filed: Feb. 19, 2002

(65) Prior Publication Data

US 2003/0171469 A1 Sep. 11, 2003

(51) Int. Cl.[7] .................................. C08K 5/53
(52) U.S. Cl. ..................... 524/123; 524/128; 524/284; 524/285; 524/286; 524/288; 524/289; 524/321; 524/322
(58) Field of Search ................ 524/123, 128, 524/284, 285, 286, 288, 289, 321, 322

(56) References Cited

U.S. PATENT DOCUMENTS

| | | |
|---|---|---|
| 3,814,869 A | 6/1974 | De Luca |
| 3,847,867 A | 11/1974 | Heath et al. |
| 3,847,869 A | 11/1974 | Koppensteiner et al. |
| 3,850,885 A | 11/1974 | Takekoshi et al. |
| 3,852,242 A | 12/1974 | White |
| 3,855,178 A | 12/1974 | White et al. |
| 3,983,093 A | 9/1976 | Williams, III et al. |
| 4,141,927 A | 2/1979 | White et al. |
| 4,588,779 A | 5/1986 | Smearing |
| 4,699,975 A * | 10/1987 | Katto et al. |
| 4,772,653 A | 9/1988 | McKenna |
| 4,794,157 A | 12/1988 | Berdahl et al. |
| 4,891,397 A | 1/1990 | Liu |
| 5,115,004 A | 5/1992 | Mochizuki et al. |
| 5,262,516 A | 11/1993 | Dellacoletta |
| 5,439,987 A | 8/1995 | Scott et al. |
| 5,648,433 A | 7/1997 | Scott |
| 5,843,541 A | 12/1998 | Alanko et al. |
| 5,888,434 A | 3/1999 | Mahoney et al. |
| 5,939,497 A | 8/1999 | Liao et al. |
| 6,001,957 A * | 12/1999 | Puyenbroek et al. |
| 6,063,874 A * | 5/2000 | Jin et al. |
| 6,166,137 A | 12/2000 | Brown et al. |
| 6,204,340 B1 * | 3/2001 | Liao et al. |
| 6,228,915 B1 | 5/2001 | Lensvelt et al. |
| 6,252,011 B1 * | 6/2001 | Scott |
| 6,316,534 B1 * | 11/2001 | Shimokusuzono et al. |
| 6,333,391 B1 | 12/2001 | Laycock et al. |

FOREIGN PATENT DOCUMENTS

| | | |
|---|---|---|
| JP | 481462 | 3/1992 |
| JP | 04081462 | 3/1992 |
| WO | WO 01/06881 A1 | 2/2001 |
| WO | WO 01/44363 A1 | 6/2001 |

OTHER PUBLICATIONS

Macromolecules–1 by Hans–Georg Elias, Tables 5–7, p. 189, Plenum Press, New York 1977.*
Chemical Abstracts Record for JP 61–072023 A2 to Okawa et al. (Toshiba Chemical), published Apr. 14, 1986.
Derwent Abstracts Record for JP 01–302533, published Dec. 6, 1989.
Derwent Abstracts Record for JP 01–302534, published Dec. 6, 1989.
Chemical Abstracts Record for JP 02–084577 to Miyazaki et al. (Toa Nenryo Kogyo), published Mar. 26, 1990.
Chemical Abstracts Record for JP 10–183358 A2 to Takagi et al. (Sankei; Okuno; Mitsui); published Jul. 14, 1998.
Chemical Abstracts Record for JP 2001–234053 A2 to Hiruta et al. (Vinctrex), published Aug. 28, 2001.
Kirk–Othmer Encyclopedia of Chemical Technology, Fourth Edition, vol. 19 at pp. 609–653, John Wiley & Sons (1996).
R. McDonald (ed.), "Colour Physics for Industry, Second Edition", The Society of Dyers and Colourists, pp. 98–105, 518–524, Bradford, UK (1997).
JP4081462, Publication Date: Mar. 16, 1992. Abstract Only (1 page).
International Search Report. Date Mailed: May 22, 2003 (6 pgs).

* cited by examiner

*Primary Examiner*—Tae H. Yoon

(57) ABSTRACT

A composition useful in the manufacturing of plastic cookware includes a polyetherimide resin and an acidic additive selected from the group consisting of aliphatic carboxylic acids having a vapor pressure less than one atmosphere at 300° C., aromatic carboxylic acids having a vapor pressure less than one atmosphere at 300° C., and combinations comprising at least one of the foregoing acidic additives. In one embodiment, the composition further comprises an additional resin, such as a polyester resin. The acidic additive is effective in improving the mold release and increasing the melt flow of the composition. Articles including the composition and a method for preparing the composition are also described.

45 Claims, No Drawings

POLYETHERIMIDE COMPOSITION, METHOD, AND ARTICLE

BACKGROUND OF INVENTION

Polyetherimide resins are known for high heat distortion temperatures and glass transition temperatures that make their use as coatings, molded articles, composites, and the like very attractive where high temperature resistance is desired. Due to their high glass transition temperature and high melt viscosity, however, polyetherimides are difficult to process into finished products. Molding, extruding, spraying, and the like must be performed at high temperatures to plasticize the polyetherimide resin. Two properties that currently limit the use of polyetherimide compositions, particularly in injection molding applications, are mold release and melt flow.

There remains a need for a polyetherimide composition exhibiting improved mold release and increased melt flow.

SUMMARY OF INVENTION

The above-described and other drawbacks and disadvantages are alleviated by a resin composition comprising a polyetherimide resin and an acidic additive selected from the group consisting of aliphatic carboxylic acids having a vapor pressure less than one atmosphere at 300° C., aromatic carboxylic acids having a vapor pressure less than one atmosphere at 300° C., and combinations comprising at least one of the foregoing acidic additives.

Other embodiments, including articles comprising the composition and a method for preparing the composition, are described in detail below.

DETAILED DESCRIPTION

One embodiment is a composition, comprising a polyetherimide resin and an acidic additive selected from the group consisting of aliphatic carboxylic acids having a vapor pressure less than one atmosphere at 300° C., aromatic carboxylic acids having a vapor pressure less than one atmosphere at 300° C., and combinations comprising at least one of the foregoing acidic additives.

The present inventors have discovered that the acidic additives are effective to increase the melt flow and improve the mold release properties of polyetherimide resins, optionally in combination with polyester resins. These advantages are achieved without significantly compromising other important properties of the composition.

The composition comprises a polyetherimide resin. In one embodiment, the resin is a polyetherimide resin comprising structural units of the formula (I)

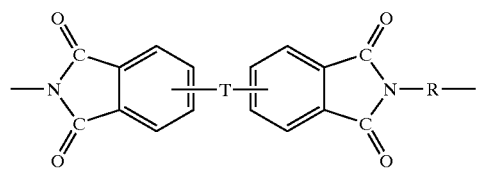

(I)

wherein the divalent T moiety bridges the 3,3', 3,4', 4,3', or 4,4' positions of the aryl rings of the respective aryl imide moieties of formula (I); T is —O— or a group of the formula —O-Z-O—; Z is a divalent radical selected from the group consisting of formulae (II)

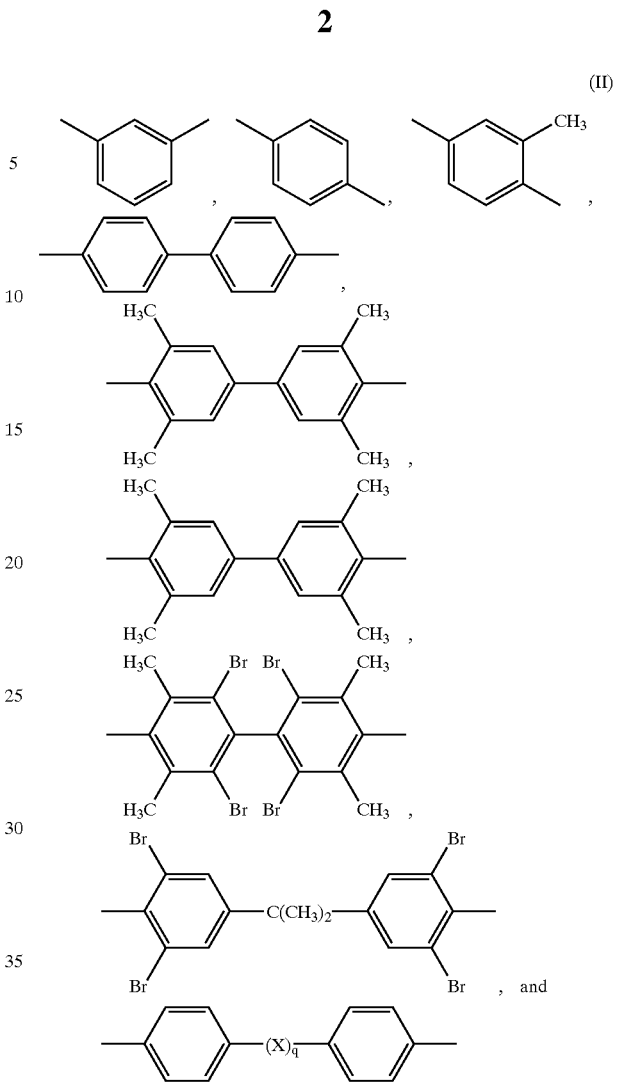

(II)

, and

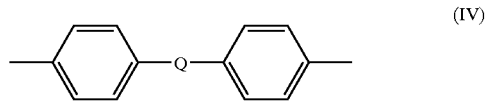

wherein X is a member selected from the group consisting of divalent radicals of the formulae (III)

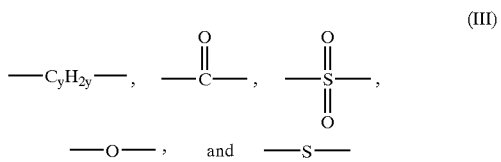

(III)

wherein y is an integer of 1 to about 5, and q is 0 or 1; R is a divalent organic radical selected from (a) aromatic hydrocarbon radicals having 6 to about 20 carbon atoms and halogenated derivatives thereof, (b) alkylene radicals having 2 to about 20 carbon atoms, (c) cycloalkylene radicals having 3 to about 20 carbon atoms, and (d) divalent radicals of the general formula (IV)

(IV)

where Q is a covalent bond or a member selected from the group consisting of formulae (V)

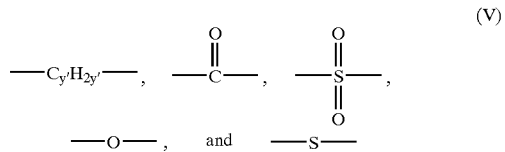

where y' is an integer from 1 to about 5.

Generally, useful polyetherimides have a melt index of about 0.1 to about 10 grams per minute (g/min), as measured by American Society for Testing Materials (ASTM) D1238 at 337° C., using a 6.6 kilogram weight.

In a preferred embodiment, the polyetherimide resin has a weight average molecular weight of about 10,000 to about 150,000 atomic mass units, as measured by gel permeation chromatography, using polystyrene standards. Such polyetherimide resins typically have an intrinsic viscosity greater than about 0.2 deciliters per gram measured in m-cresol at 25° C. An intrinsic viscosity of at least about 0.35 deciliters per gram may be preferred. Also, an intrinsic viscosity of up to about 0.7 deciliters per gram may be preferred.

Included among the many methods of making the polyetherimide resin are those disclosed in, for example, U.S. Pat. Nos. 3,847,867, 3,847,869, 3,850,885, 3,852,242, 3,855,178, and 3,983,093.

In a preferred embodiment, the polyetherimide resin comprises structural units according to formula (I) wherein each R is independently paraphenylene or metaphenylene and T is a divalent radical of the formula (VI).

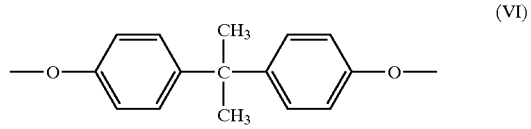

A particularly preferred polyetherimide resin is the reaction product formed by melt polymerization of 2,2-bis[4-(3,4-dicarboxyphenoxy)phenyl]propane dianhydride with one or more of paraphenylene diamine and metaphenylene diamine. The polyetherimides are commercially available from GE Plastics as ULTEM® resins, including, for example, ULTEM® 1000, ULTEM® 1010, ULTEM® 6000, and ULTEM® CRS5000.

The composition may comprise the polyetherimide in an amount of about 50 weight percent to about 99.99 weight percent, based on the total weight of the composition. Within this range it may be preferred to use a polyetherimide amount of at least about 80 weight percent, more preferably at least about 90 weight percent, still more preferably at least about 96 weight percent. Also within this range, it may be preferred to use a polyetherimide amount of up to about 99.9 weight percent, more preferably up to about 99 weight percent, still more preferably up to about 98 weight percent.

In addition to a polyetherimide, the composition comprises an acidic additive selected from aliphatic carboxylic acids having a vapor pressure less than one atmosphere at 300° C., aromatic carboxylic acids having a vapor pressure less than one atmosphere at 300° C., combinations comprising at least one of the foregoing acidic additives, and the like. The acidic additives are in the form of their free carboxylic acids rather than acid salts. It is preferred that the aliphatic carboxylic acids and the aromatic carboxylic acids have a vapor pressure less than one atmosphere at 325° C., more preferably at 350° C. While not wishing to be bound by any particular hypothesis, the present inventors believe that volatility of the acidic additive determines the degree to which it is retained in the composition during compounding and molding steps, particularly compounding steps conducted under partial vacuum. Acidic additives having a vapor pressure greater than or equal to one atmosphere at 300° C. may be too volatile to be sufficiently retained by the composition. The volatility limitation has been expressed as a vapor pressure limitation rather than a boiling point limitation because some of the acidic additives sublime and therefore do not exhibit a true boiling point. That said, for compounds exhibiting a boiling point, the volatility limitation may be expressed as a boiling point greater than about 300° C. at one atmosphere The acidic additive may comprise an aliphatic carboxylic acid. In one embodiment, the aliphatic carboxylic acid has the structure (VII)

$$R-(CO_2H)_n \quad \text{(VII)}$$

wherein R is a substituted or unsubstituted aliphatic hydrocarbon radical, and n is 1 to about 6. The radical R may be straight chain, branched, cyclic, or a combination thereof. When R is substituted, it may comprise one or more substituents including $C_1-C_{18}$ alkoxy, $C_6-C_{18}$ aryl, $C_6-C_{18}$ aryloxy, nitro, halogeno (preferably chloro), hydroxy, amino, amido, alkoxycarbonyl, or the like. In a preferred embodiment, n is 1 or 2. In another preferred embodiment, n is 1. When R includes an aryl and/or aryloxy substituent, at least one carboxylic acid must be covalently bound to an aliphatic carbon of the aliphatic hydrocarbon radical R. In one embodiment, R is free of aryl substituents.

Although R may include aliphatic unsaturation, it is preferred that R is saturated (i.e., free of aliphatic unsaturation). In a preferred embodiment, the composition comprises a saturated aliphatic monocarboxylic acid. The saturated aliphatic monocarboxylic acid may preferably have about 12 to about 36 carbon atoms. Within this range, the saturated aliphatic monocarboxylic acid may preferably have at least about 14 carbon atoms, more preferably at least about 16 carbon atoms. Also within this range, the saturated aliphatic monocarboxylic acid may preferably have up to about 30 carbon atoms, more preferably up to about 24 carbon atoms.

Suitable aliphatic carboxylic acids include tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentriacontanoic acid, dotriacontanoic acid, tritriacontanoic acid, tetratriacontanoic acid, pentatriacontanoic acid, hexatriacontanoic acid, 1,5-pentanedioic acid, 1,6-hexanedioic acid, 1,7-heptanedioic acid, 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,3-cyclohexanedicarboxylic acid, 1,4-cyclohexanedicarboxylic acid, palmitoleic acid, oleic acid, linolenic acid, cetoleic acid, p-phenylenediacetic acid, and the like, and combinations comprising at least one of the foregoing aliphatic carboxylic acids.

Preferred aliphatic carboxylic acids include hexadecanoic acid, octadecanoic acid, eicosanoic acid, docosanoic acid, tetracosanoic acid, and the like, and combinations comprising at least one of the foregoing aliphatic monocarboxylic acids.

In a highly preferred embodiment, the aliphatic carboxylic acid comprises octadecanoic acid. Octadecanoic acid is preferred not only for its ability to increase melt flow, but also because it provides blends with improved transparency.

The acidic additive may comprise an aromatic carboxylic acid. In one embodiment, the aromatic carboxylic acid may have the structure (VIII)

Ar—(CO$_2$H)$_n$ (VIII)

wherein Ar is a substituted or unsubstituted aromatic hydrocarbon radical, and n is 1 to about 6. When Ar is substituted, it may comprise one or more substituents including $C_1$–$C_{18}$ alkyl, $C_1$–$C_{18}$ alkoxy, nitro, halogeno, hydroxy, amino, amido, alkoxycarbonyl, or the like. In one embodiment, Ar is free of alkyl substituents. When R includes an alkyl substituent, at least one carboxylic acid must be covalently bound to an aromatic carbon of the aromatic hydrocarbon radical Ar. In a preferred embodiment, n is 1 or 2. In another preferred embodiment, n is 1.

In a preferred embodiment, the aromatic carboxylic acid has about 8 to about 36 carbon atoms. Within this range, the aromatic carboxylic acid may preferably have at least about 10 carbon atoms, more preferably at least about 12 carbon atoms. Also within this range, the aromatic carboxylic acid may preferably have up to about 30 carbon atoms, more preferably up to about 24 carbon atoms.

In a preferred embodiment, the aromatic carboxylic acid is selected from the group consisting of (IX)

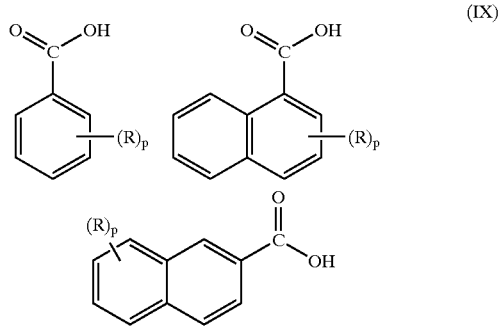

(IX)

wherein each R is independently $C_1$–$C_{18}$ alkyl, $C_1$–$C_{18}$ alkoxy, nitro, amino, halogeno (preferably chloro), carboxy, hydroxy, and the like; and p is 1 to the maximum number of substitutable positions on the aromatic ring (i.e., 1 to 5 for substituted benzoic acids and 1 to 7 for substituted naphthoic acids).

In another embodiment, the aromatic carboxylic acid may have the structure (X)

(X)

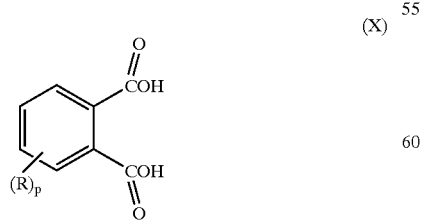

wherein each R is independently $C_1$–$C_{18}$ alkyl, $C_1$–$C_{18}$ alkoxy, nitro, halogeno (preferably chloro), carboxy, hydroxy, and the like; and p is 1 to 4.

Suitable aromatic carboxylic acids further include those having the structure (XI)

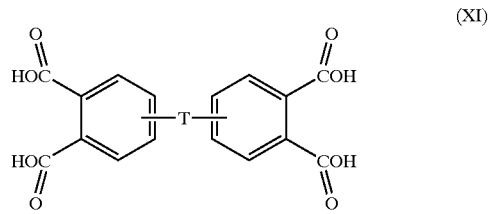

(XI)

wherein the divalent T moiety bridges the 3,3',3,4', 4,3', or 4,4' positions of the aryl rings of the respective aryl phthalic anhydride moieties of formula (XI); T is a covalent bond or —O— or a group of the formula —O—Z—O—; Z is a divalent radical selected from the group consisting of formulae (II):

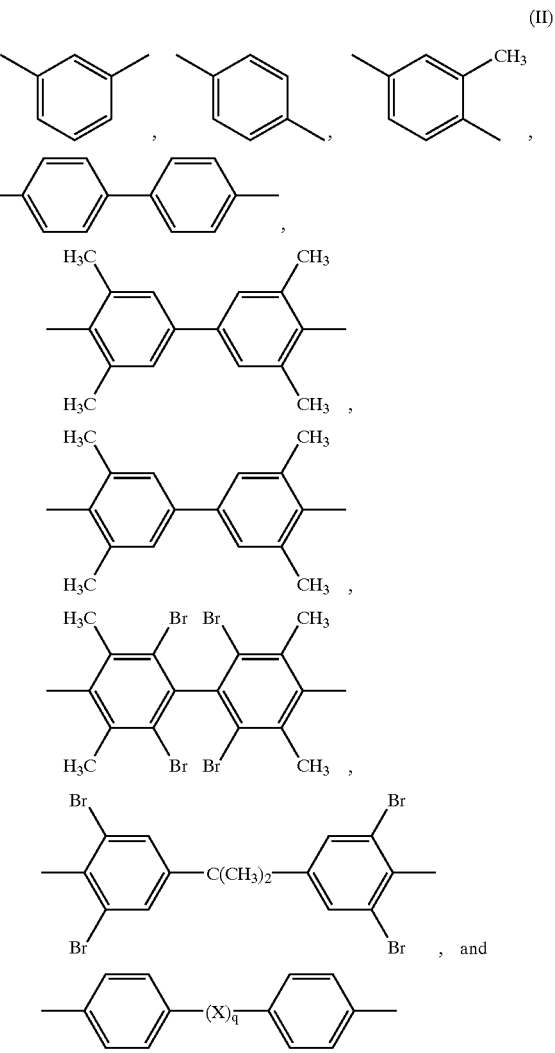

(II)

wherein X is a covalent bond or a member selected from the group consisting of divalent radicals of the formulae (III):

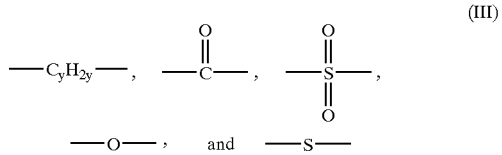

(III)

wherein y is an integer from 1 to about 5, and q is 0 or 1.

Specific aromatic carboxylic acids include, for example, phthalic acid, isophthalic acid, terephthalic acid, 2-aminobenzoic acid, 3-aminobenzoic acid, 4-aminobenzoic acid, 1,2,4-benzenetricarboxylic acid, 1,3,5-benzenetricarboxylic acid, 1,2,4,5-benzenetetracarboxylic acid, 4-phenylbenzoic acid, 2-hydroxy-1-naphthoic acid, 3-hydroxy-1-naphthoic acid, 4-hydroxy-1-naphthoic acid, 5-hydroxy-1-naphthoic acid, 6-hydroxy-1-naphthoic acid, 7-hydroxy-1-naphthoic acid, 8-hydroxy-1-naphthoic acid, 1-hydroxy-2-naphthoic acid, 3-hydroxy-2-naphthoic acid, 4-hydroxy-2-naphthoic acid, 5-hydroxy-2-naphthoic acid, 6-hydroxy-2-naphthoic acid, 7-hydroxy-2-naphthoic acid, 8-hydroxy-2-naphthoic acid, 2,2'-biphenyldicarboxylic acid, 4,4'-biphenyldicarboxylic acid, 4,4'-oxybisbenzoic acid, and the like, and mixtures comprising at least one of the foregoing aromatic carboxylic acids.

Other specific aromatic acids include, for example, 2,2-bis[4-(3,4-dicarboxyphenoxy)phenyl]propane, perylene-3,4,9,10-tetracarboxylic acid, tricyclo (4.2.2.0(2,5))dec-9-ene-3,4,7,8-tetracarboxylic acid, 1,4,5,8-naphthalenetetracarboxylic acid, 3,3',4,4'-benzophenonetetracarboxylic acid, 3,3',4,4'-biphenyltetracarboxylic acid, and 4,4'-oxydibenzoic acid. Also included are aromatic carboxylic acids with accompanying anhydride functionality in the same molecule. In particular embodiments carboxylic acids accompanied by anhydride functionality in the same molecule comprise aromatic 1,2-dicarboxylic acids. Also included are mixtures of carboxylic acids with their corresponding anhydrides. In particular embodiments any suitable aromatic 1,2-dicarboxylic acid may be used as a mixture with its corresponding anhydride.

Particularly preferred aromatic carboxylic acids include phthalic acid, isophthalic acid, terephthalic acid, hydroxy-substituted isophthalic acids, acetyloxy-substituted benzoic acids, p-aminobenzoic acid, naphthalene carboxylic acids and dicarboxylic acids, and 1-naphthylphthalamic acid (naphthalam; Chemical Abstracts Registry No. 132-66-1).

Suitable acidic additives also include any acidic species that may be derived from any of the above mentioned aliphatic or aromatic carboxylic acids through reaction under the processing conditions used for combining said acid with polyetherimide. In one example, a suitable acid may be derived from partial decarboxylation of a multifunctional carboxylic acid, such as a dicarboxylic acid or a tri- or tetracarboxylic acid under the processing conditions. In another embodiment suitable acidic additives may be derived from oligomer species such as oligomeric esters of hydroxy carboxylic acids, which may decompose under the processing conditions to provide a carboxylic acid. In one example, a poly(salicylate) derived from oligomerization of 2-hydroxybenzoic acid may be employed.

The acid additive may be employed in an amount effective to increase the melt flow of the composition and/or improve the mold release properties of the composition. In general, an effective amount of the acidic additive is about 0.01 to about 4 weight percent, based on the total weight of the composition. Within this range, it may be preferred to use the acidic additive in an amount of at least about 0.05 weight percent, more preferably at least about 0.1 weight percent, yet more preferably at least about 0.2 weight percent. Also within this range, it may be preferred to use the acidic additive in an amount of up to about 2 weight percent, more preferably up to about 1 weight percent, yet more preferably up to about 0.9 weight percent.

The composition may, optionally, further comprise one or more additional resins. Suitable resins include, for example, polycarbonates; polyestercarbonates; polyesters including poly(ethylene terephthalate), poly(trimethylene terephthalate), poly(butylene terephthalate), poly(ethylene naphthalate), poly(cyclohexanedimethanol terephthalate), poly(cyclohexanedimethanol-co-ethylene terephthalate), and the like; polyarylates including those comprising structural units derived from (a) one of more aromatic diols such as resorcinol or bisphenol A, and (b) one or more aromatic dicarboxylic acids such as isophthalic acid, terephthalic acid, or naphthalene-2,6-dicarboxylic acid, or the like; poly(arylene ether) resins, including poly(2,6-dimethyl-1,4-phenylene ether) and poly(2,6-dimethyl-1,4-phenylene-co-2,3,6-trimethyl-1,4-phenylene ether); poly(arylene sulfide) resins; poly(benzimidazole) resins; polyamides; polyetherketones; polyketones; functionalized polyolefins; and the like; and combinations comprising at least one of the foregoing resins. Such additional resins, when present, may be used in an amount of about 1 to about 50 weight percent, preferably up to about 30 weight percent, based on the total weight of the composition.

In a preferred embodiment, the composition further comprises a polyester resin. Polyester blends with polyetherimide resins are described, for example, in U.S. Pat. Nos. 4,141,927 to White et al., U.S. Pat. No. 5,439,987 to Scott et al., U.S. Pat. No. 5,648,433 to Scott, U.S. Pat. No. 5,939,497 to Liao et al., and U.S. Pat. No. 6,063,874 to Jin et al. Suitable polyester resins comprise repeating units having the formula (XII)

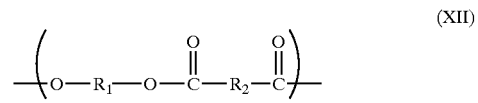

(XII)

wherein $R_1$ represents the residue of the diol or diol equivalent ("diol residue"), $R_2$ represents the residue of the diacid or diacid equivalent ("diacid residue"), and each $R_1$ and $R_2$ is independently a divalent acyclic hydrocarbon radical, a divalent alicyclic hydrocarbon radical, or a divalent aromatic hydrocarbon radical.

As used herein, the term "acyclic hydrocarbon radical" means a straight chain or branched saturated hydrocarbon radical, preferably containing about 2 to about 12 carbon atoms per radical, such as, for example, dimethylene, trimethylene, tetramethylene, hexamethylene, octamethylene, and the like.

As used herein, the term "alicyclic hydrocarbon radical" means a hydrocarbon radical containing one or more saturated hydrocarbon rings, preferably containing about 4 to about 10 carbon atoms per ring, which optionally may be substituted on one or more of the rings with one or more alkyl groups, each preferably containing about 2 to about 6 carbon atoms per group and which, in the case of two or more rings, may be fused rings. Specific alicyclic hydrocarbon radicals include, for example, 2,2,4,4-tetramethyl-1,3-cyclobutylene, 1,4-cyclohexylene, cyclohexylene-1,4-dimethylene, 1,4-cyclooctylene, and the like.

As used herein, the term "aromatic hydrocarbon radical" means a hydrocarbon radical containing one or more aromatic rings per radical, which may optionally be substituted on one or more aromatic rings with one or more alkyl groups, each preferably containing about 2 to about 6 carbon atoms per group and which, in the case of two or more rings, may be fused rings. Specific aromatic hydrocarbon radicals include, for example, 1,2-phenylene, 1,3-phenylene, 1,4-phenylene, 2,6-naphthylene, 2,7-phenathrylene, and the like.

Suitable diols include acyclic diols such as, for example, ethylene glycol, 1,3-propylene glycol, 1,4-butane glycol, 1,5-pentane diol, 1,6-hexane diol, 1,7-heptane diol, 1,8-octane diol, 1,9-nonane diol, 1,10-decane diol, 1,12-dodecane diol, and the like; alicyclic diols such as, for example, 2,2,4,4-tetramethyl-1,3-cyclobutane diol, 3,4-cyclopentanediol, 1,4-cyclohexanedimethanol including cis-1,4-cyclohexanedimethanol and trans-1,4-cyclohexanedimethanol, and the like; and aromatic diols such as, for example, bisphenol A and hydroquinone, and the like. Suitable diol equivalents include corresponding esters and ethers, such as for example, dialkyl esters and diaryl esters, and the like. Mixtures of diols may also be employed.

Suitable diacids include, for example, dicarboxylic acids, such as, for example, phthalic acid, isophthalic acid, terephthalic acid, dimethyl terephthalic acid, oxalic acid, malonic acid, succinic acid, glutaric acid, adipic acid, pimelic acid, suberic acid, azelaic acid, sebacic acid, dimethyl malonic acid, 1,12-dodecanoic acid cis-1,4-cyclohexane dicarboxylic acid, trans-1,4-cyclohexane dicarboxylic acid, 4,4'-bisbenzoic acid, and naphthalene-2,6-dicarboxylic acid, among others. Suitable diacid equivalents include, for example, corresponding anhydride, ester or halide derivatives, such as, for example, phthalic anhydride, dimethyl terephthalate, and succinyl chloride, and the like. Mixtures of diacids may also be employed.

In a preferred embodiment, the polyester resins have a number average molecular weight of about 10,000 to about 100,000 atomic mass units as measured by gel permeation chromatography using polystyrene standards. Within this range, a number average molecular weight of at least about 15,000 atomic mass units may be preferred. Also within this range, a number average molecular weight of up to about 50,000 atomic mass units may be preferred.

Methods for making polyester resins are well know in the art, see for example, Kirk-Othmer Encyclopedia of Chemical Technology, Fourth Edition, Vol. 19 at pp. 609–653, John Wiley & Sons (1996).

Among polyester resins, polyethylene terephthalate resins are particularly preferred for their ability to impart improved flow and increased transparency to the composition. Polyethylene terephthalate resins and methods for their preparation are known in the art. A suitable polyethylene terephthalate resin may be obtained by polymerizing a glycol component comprising at least 70 mole percent, more preferably at least about 80 mole percent, of ethylene glycol or a polyester-forming derivative thereof, and an acid component comprising at least 70 mole percent, more preferably at least about 80 mole percent, of terephthalic acid or a polyester-forming derivative thereof. The preferred glycol component may contain up to 30 mole percent, preferably up to 20 mole percent, of another glycol, such as trimethylene glycol, butylene glycol, 2-methyl-1,3-propane glycol, hexamethylene glycol, decamethylene glycol, cyclohexane dimethanol, neopentylene glycol, polyester-forming derivatives thereof, or the like, or a combination comprising at least one of the foregoing glycols. The preferred acid component may contain up to 30 mole percent, preferably up to 20 mole percent, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethane dicarboxylic acid, p-hydroxy benzoic acid, sebacic acid, adipic acid, polyester-forming derivatives thereof, or the like, or combinations comprising at least one of the foregoing acid components.

In a highly preferred embodiment, the polyethylene terephthalate resin is formed by polycondensation of substantially equimolar quantities of ethylene glycol and terephthalic acid.

In one embodiment, the polyethylene terephthalate resin has an intrinsic viscosity of about 0.4 to about 2.0 deciliters per gram (dL/g), measured at 23° C. in a 60:40 weight/weight mixture of phenol and tetrachloroethylene. Within this range, it may be preferred to use a polyethylene terephthalate with an intrinsic viscosity of at least about 0.3 dL/g, more preferably at least about 0.5 dL/g. Also within this range, it may be preferred to use a polyethylene terephthalate with an intrinsic viscosity of up to about 0.9 dL/g, more preferably up to about 0.7 dL/g.

When present, the polyester resin may be included at about 1 to about 30 weight percent of the polyethylene terephthalate resin, based on the total weight of the composition. Polyethylene terephthalate amounts less than about 1 weight percent are insufficient to impart significant advantages to the composition. Polyethylene terephthalate amounts greater than about 30 weight percent may cause an undesirable reduction in the glass transition temperature of the composition. Within this range, the polyethylene terephthalate amount may preferably be at least about 5 weight percent, more preferably at least about 10 weight percent. Also within this range, the polyethylene terephthalate amount may preferably be up to about 25 weight percent, more preferably up to about 20 weight percent.

The composition may, optionally, comprise an inorganic filler. Such inorganic fillers include, for example, glass fibers, milled glass, glass flake, glass spheres, clays, talcs, micas, barium sulfate, titanium dioxide, wollastonites, zinc oxides, and the like, and combinations comprising at least one of the foregoing inorganic fillers. When present, the inorganic filler may be used at up to about 50 weight percent, based on the total weight of the composition.

In one embodiment, the composition is substantially free of carbon fibers. Substantially free of carbon fibers is herein defined as comprising less than 0.1 weight percent of carbon fibers. It is preferred that the composition comprises no intentionally added carbon fibers.

The composition may, optionally, comprise various additives known in the art. Such additives include, for example, antioxidants, flame retardants, drip retardants, crystallization nucleators, dyes, pigments, colorants, reinforcing agents, stabilizers, antistatic agents, plasticizers, lubricants, and the like, and combinations comprising at least one of the foregoing additives. Effective amounts of the additives vary widely, but they are usually present in an amount up to about 50% or more by weight, based on the total weight of the composition.

Preferred stabilizers include phosphorus-containing stabilizers of the formula (XIII)

$$(HO)_{3-a}P(OR)_a \qquad (XIII)$$

where each R is independently $C_1$–$C_{18}$ alkyl, $C_6$–$C_{18}$ aryl, $C_7$–$C_{18}$ alkylaryl, or $C_7$–$C_{18}$ aralkyl; and a is 0, 1, 2, or 3. Especially preferred phosphorus-containing stabilizers include the reaction product of phosphorus trichloride with 1,1-biphenyl and 2,4-t-butylphenol; sodium phenyl phosphonate; and di-tert-butyl phenyl phosphite; and the like;

and combinations comprising at least one of the foregoing phosphorus-containing stabilizers.

In a preferred embodiment, the composition comprises about 96 to about 99.95 weight percent of a polyetherimide and about 0.05 to about 4 weight percent of an acidic additive selected from the group consisting of aliphatic carboxylic acids having a vapor pressure less than one atmosphere at 300° C., aromatic carboxylic acids having a vapor pressure less than one atmosphere at 300° C., and combinations comprising at least one of the foregoing acidic additives.

In another preferred embodiment, the composition comprises about 98 to about 99.95 weight percent of a polyetherimide; and about 0.05 to about 2 weight percent of octadecanoic acid.

In another preferred embodiment, the composition comprises about 70 to about 98.95 weight percent of a polyetherimide; about 1 to about 30 weight percent of a polyester resin; and about 0.05 to about 2 weight percent of an acidic additive selected from the group consisting of aliphatic carboxylic acids having a vapor pressure less than one atmosphere at 300° C., aromatic carboxylic acids having a vapor pressure less than one atmosphere at 300° C., and combinations comprising at least one of the foregoing acidic additives.

In another preferred embodiment, the composition comprises about 70 to about 98.95 weight percent of a polyetherimide; about 1 to about 30 weight percent of a polyester resin; and about 0.05 to about 2 weight percent of octadecanoic acid.

As chemical reactions may occur between components during blending and molding, it will be understood that one embodiment is a composition comprising the reaction product of any of the above compositions.

Preparation of the composition is normally achieved by melt blending the ingredients under conditions for the formation of an intimate blend. Such conditions often include mixing in single or twin screw type extruders or similar mixing devices that can apply a shear to the components. It may be advantageous not to apply a vacuum to the melt when preparing these compositions.

All of the ingredients may be added initially to the processing system, or else certain additives may be pre-compounded with each other. It appears that certain properties, such as impact strength and elongation, are sometimes enhanced by initially pre-dispersing one or more additives with a portion of the resin to make a concentrate and subsequently letting down the concentrate with additional resin and any additional ingredients. While separate extruders may be used, the composition may also be prepared by using a single extruder having multiple feed ports along its length to accommodate the addition of the various components. Those of ordinary skill in the art will be able to adjust blending times and temperatures, as well as component addition location and sequence, without undue additional experimentation.

The composition is useful for making molded articles such as, for example, microwave cookware, kitchen utensils such as spatulas, serving spoons and knife handles, connectors, and enclosures and clips for electrical and telecommunications applications, as well as for structural and cosmetic parts for transportation applications. These resins may also be useful in films and articles prepared from films by thermoforming or lamination.

The composition exhibits excellent physical properties. For example the composition after molding may exhibit good clarity, as evidenced by a percent transmittance of at least about 50 percent, more preferably at least about 60 percent, measured according to ASTM D1003 at a sample thickness of ⅛ inch. The composition after molding may also exhibit a yellowness index (YI) measured at a thickness of ⅛ inch according to ASTM D1925 of less than about 80, preferably less than about 70. The composition after molding may also exhibit a flexural modulus of at least 300 kpsi, yet more preferably at least about 400 kpsi, measured at 23° C. according to ASTM D790. The composition after molding may also exhibit a reverse notched Izod impact strength of at least about 10 foot-pounds per inch (ft-lb/in), more preferably at least about 13 ft-lb/in, yet more preferably at least about 15 ft-lb/in, measured at 23° C. according to ASTM D256.

The invention is further illustrated by the following non-limiting examples.

EXAMPLE 1, COMPARATIVE EXAMPLES 1–4

Four compositions were prepared, varying in the type of additive. When present, the additives are used at 0.3 weight percent, based on the total weight of the composition. A polyetherimide resin having a Vicat softening point of 215° C. was obtained as ULTEM® 1010 from General Electric Company. Pentaerythritol tetrastearate (PETS), pentaerythritol pentabenzoate (PETB), and octadecanoic acid (stearic acid) were obtained from Cognis. An isoalcohol ester of a saturated fatty acid was obtained as LOXIOL® G40 from Cognis.

Compositions were prepared by blending the components in a paint shaker for about 5 minutes. The mixed ingredients were then melted together on a 2.5 inch single-screw extruder at 330° C. at 80 rpm. No vacuum was applied. The molten polymer extrudate was cooled in a water bath and chopped into pellets. The resin pellets were then dried for about 4 hours at 150° C. and injection molded into a part to measure release pressure. The part was a shallow square box with a diagonal length of 4 inches, a side wall height of 1.5 inches and a wall thickness one-eighth inch. The box was injection molded at a barrel temperature of 675° F. with a mold temperature of 275° F., injection pressure of 12,000 psi, and molding cycle of 20 seconds. The mold was single gated at the center of the base. The minimum ejection pressure necessary to push the molded part from the steel tool using the knock out pins was measured as the ejection pressure. Each ejection pressure value (expressed in units of psi) is the average of the molding and ejection of ten parts.

The appearance of each sample was determined by visual inspection, and glass transition temperature ($T_g$) was measured by differential scanning calorimetry. Compositions and properties are summarized in Table 1. The results show that Example 1, with octadecanoic acid, exhibited the lowest mold release pressure and a clear appearance, while sacrificing only 3° C. in glass transition temperature compared to Comparative Example 1 without any additive.

TABLE 1

|  | Ex. 1 | C Ex. 1 | C. Ex. 2 | C. Ex. 3 | C. Ex. 4 |
| --- | --- | --- | --- | --- | --- |
| COMPOSITION |  |  |  |  |  |
| ULTEM ® 1010 | 99.7 | 100.0 | 99.7 | 99.7 | 99.7 |
| octadecanoic acid | 0.3 | 0.0 | 0.0 | 0.0 | 0.0 |
| PETS | 0.0 | 0.0 | 0.3 | 0.0 | 0.0 |
| PETB | 0.0 | 0.0 | 0.0 | 0.3 | 0.0 |
| LOXIOL ® G40 | 0.0 | 0.0 | 0.0 | 0.0 | 0.3 |

TABLE 1-continued

|  | Ex. 1 | C Ex. 1 | C. Ex. 2 | C. Ex. 3 | C. Ex. 4 |
|---|---|---|---|---|---|
| PROPERTIES |  |  |  |  |  |
| appearance | clear | clear | opaque | clear | clear |
| release pressure (psi) | 384 | 1859 | 473 | (parts broke) | 533 |
| $T_g$ (° C.) | 215 | 218 | 218 | 217 | 216 |

EXAMPLE 2, COMPARATIVE EXAMPLES 5 AND 6

This experiment provides physical property measurements for polyetherimide compositions comprising octadecanoic acid, pentaerythritol tetrastearate, or no additive. Compositions are summarized in Table 2. Melt index (MI) was measured at 337° C. and 6.6 kilograms according to ASTM D1238. Heat distortion temperature was measured at 264 psi according to ASTM D648. Glass transition temperature ($T_g$) was measured by differential scanning calorimetry. Tensile strength at yield and tensile elongation at break were measured at 23° C. according to ASTM D638. Flexural strength and flexural modulus were measured at 23° C. according to ASTM D790. Notched and reverse Notched Izod impact strengths were measured according to ASTM D256. Falling dart (Dynatup) biaxial impact was measured as energy at maximum load (max. load) and total energy at 100° C. according to ASTM D3763. The fraction of samples showing ductile failure, a punch through with tearing, rather than brittle cracking was noted. Appearances were determined by visual inspection on ⅛ inch thick samples. The results, summarized in Table 2, show that the Example 2 composition, containing octadecanoic acid, exhibited superior tensile elongation, flexural modulus, and clarity compared to Comparative Example 6, containing PETS.

TABLE 2

|  | Ex. 2 | C. Ex. 5 | C. Ex. 6 |
|---|---|---|---|
| COMPOSITION |  |  |  |
| ULTEM ® 1010 | 99.7 | 100.0 | 99.7 |
| octadecanoic acid | 0.3 | 0.0 | 0.0 |
| PETS | 0.0 | 0.0 | 0.3 |
| PROPERTIES |  |  |  |
| melt index, 337° C., 6.6 kg (g/10 min) | 2.35 | 1.72 | 2.22 |
| heat distortion temperature, 264 psi (° C.) | 197 | 199 | 199 |
| glass transition temperature (° C.) | 216.7 | 221.8 | 219.2 |
| tensile strength at yield (kpsi) | 15.9 | 16.0 | 16.1 |
| tensile elongation at break (%) | 58 ± 24 | 82 ± 17 | 14 ± 5 |
| flexural strength (kpsi) | 22.9 | 22.8 | 23.0 |
| flexural modulus (kpsi) | 478 | 481 | 183 |
| notched Izod (ft-lb/in) | 1.2 | 1.2 | 1.4 |
| reverse notched Izod (ft-lb/in) | 15.6 | 19.0 | 14.7 |
| biaxial impact max. load at 100° C. (ft-lb) | 26.4 ± 20 | 64.9 ± 3 | 30.3 ± 18 |
| biaxial impact total energy at 100° C. (ft-lb) | 24.4 ± 18 | 58.5 ± 3 | 28.0 ± 16 |
| fraction ductile | 2/3 | 3/3 | 2/3 |
| appearance | clear | clear | hazy |

EXAMPLES 3 AND 4 COMPARATIVE EXAMPLES 7 AND 8

This experiment illustrates the advantages that can be obtained using a polyetherimide/polyethylene terephthalate blend. A polyethylene terephthalate having an intrinsic viscosity of 0.85 deciliters per gram was obtained as CRYSTAR® 5005 from DuPont. The phosphite antioxidant bis(2,4-dicumylphenyl pentaerythritol) diphosphite was obtained as DOVERPHOS® S9228 from Dover Chemical Corporation. The hindered phenol tetrakis(methylene(3,5-di-t-butyl-4-hydroxyhydrocinnamate) was obtained as IRGANOX® 1010 from Ciba-Geigy.

The compositions were compounded and tested as described above. Compositions and properties are summarized in Table 3. The results show that Example 4, with polyetherimide and polyethylene terephthalate and octadecanoic acid, exhibits reduced release pressure and improved flow compared to Comparative Example 8, with polyetherimide and polyethylene terephthalate but no additive; transparency and other physical properties were similar for the two samples.

TABLE 3

|  | Ex. 3 | C. Ex. 7 | Ex. 4 | C. Ex. 8 |
|---|---|---|---|---|
| COMPOSITION |  |  |  |  |
| ULTEM ® 1010 | 99.7 | 100.0 | 84.45 | 84.75 |
| PET, 0.85 IV | 0.0 | 0.0 | 15.0 | 15.0 |
| octadecanoic acid | 0.3 | 0.0 | 0.3 | 0.0 |
| IRGANOX ® 1010 | 0.0 | 0.0 | 0.15 | 0.15 |
| DOVERPHOS ® S9228 | 0.0 | 0.0 | 0.1 | 0.1 |
| PROPERTIES |  |  |  |  |
| mold release pressure (psi) | 497 | 3890 | 505 | 630 |
| melt index, 337° C., 6.6 kg (g/10 min) | 2.2 | 1.73 | — | — |
| melt index, 295° C., 6.6 kg (g/10 min) | — | — | 1.15 | 0.98 |
| heat distortion temperature, 264 psi (° C.) | 195 | 197 | 163 | 165 |
| glass transition temperature (° C.) | 216 | 218 | 183 | 187 |
| tensile strength at yield (kpsi) | 15.9 | 15.4 | 16.7 | 16.2 |
| tensile elongation at break (%) | 75 | 63 | 24 | 43 |
| flexural strength (kpsi) | 23.0 | 22.8 | 22.9 | 22.9 |
| flexural modulus (kpsi) | 443 | 437 | 438 | 423 |
| reverse notched Izod (ft-lb/in) | 18 | 19 | 16 | 16 |
| appearance | clear | clear | clear | clear |

EXAMPLES 5–9, COMPARATIVE EXAMPLE 9

These examples and comparative examples illustrate that the addition of an acid additive to a polyetherimide provides an increase in melt flow. Higher melt flow is useful for achieving fast molding cycles and molding of complex parts. The polyetherimide compositions were prepared using no additive, octadecanoic acid, or p-aminobenzoic acid (obtained from Aldrich), using additive amounts specified in Table 4. Compositions were extruded on a 28 millimeter Werner & Pfleiderer twin-screw extruder at 320 rpm with barrel set temperatures of 260 (feed throat), 330, 330, 330, 330, and 330° C. Extrudates were quenched in water, pelletized, and dried in a circulating air oven at 100–110° C. before testing.

Polyetherimide molecular weight values, i.e., weight average molecular weight ($M_w$) and number average molecular weight ($M_n$), were obtained by dissolving 10–15 milligrams solid sample in 20 milliliters solvent consisting of 1000 milliliters reagent chloroform mixed with 25 milliliters 100% ethanol. The solution was analyzed on a single column (Polymer Laboratories PLgel 5-micron mixed-C column) at a flow rate 0.5 milliliters per minute at 40° C. Molecular weight values are expressed in atomic mass units (AMU). Pellets of all samples were tested for melt index at 337° C. with a 6.6 kg load (ASTM D1238). Results are given in Table 4.

The results show substantial increases in melt index for the Examples 5–9 versus Comparative Example 9. These increases in melt index were achieved with only very small decreases in the molecular weight of the polyetherimide.

TABLE 4

|  | C. Ex. 9 | Ex. 5 | Ex. 6 |
|---|---|---|---|
| COMPOSITION |  |  |  |
| ULTEM ® 1010 (wt %) | 100.0 | 99.7 | 99.9 |
| octadecanoic acid (wt %) |  | 0.3 | 0.1 |
| p-aminobenzoic acid (wt %) |  |  |  |
| PROPERTIES |  |  |  |
| $M_w$ (AMU) | 45,546 | 42,187 | 42,082 |
| $M_n$ (AMU) | 20,289 | 19,042 | 19,969 |
| melt index, 337° C., 6.6 kg (g/10 min) | 1.96 | 3.55 | 2.90 |

|  | Ex. 7 | Ex. 8 | Ex. 9 |
|---|---|---|---|
| COMPOSITION |  |  |  |
| ULTEM ® 1010 (wt %) | 99.9 | 99.7 | 99.4 |
| octadecanoic acid (wt %) |  |  |  |
| p-aminobenzoic acid (wt %) | 0.1 | 0.3 | 0.6 |
| PROPERTIES |  |  |  |
| $M_w$ (AMU) | 40,640 | 39,638 | 38,913 |
| $M_n$ (AMU) | 18,922 | 18,299 | 18,526 |
| melt index, 337° C., 6.6 kg (g/10 min) | 3.41 | 3.63 | 5.02 |

EXAMPLE 10, COMPARATIVE EXAMPLE 10

A sample containing 0.3 weight percent octadecanoic acid (Ex. 10) and a control without any additive (C. Ex. 10) were compounded and molded as described above. CIELAB values were measured on ⅛ inch thick samples as described in R. McDonald (ed.), "Colour Physics for Industry, Second Edition", The Society of Dyers and Colourists, Bradford, UK (1997). Yellowness index was measured on ⅛ inch thick samples according to ASTM 1925. Compositions and properties are given in Table 5. Percent haze was measured on ⅛ inch samples at 550 nanometers using a Pacific Gardner XL 835 calorimeter. The results show that Example 10 with octadecanoic acid exhibits improved flow versus Comparative Example 10, while retaining similar transparency and low haze.

TABLE 5

|  | Ex. 10 | C. Ex. 10 |
|---|---|---|
| COMPOSITION |  |  |
| ULTEM ® 1010 (wt %) | 99.7 | 100.0 |
| octadecanoic acid (wt %) | 0.3 |  |
| PROPERTIES |  |  |
| melt index, 337° C., 6.6 kg (g/10 min) | 1.13 | 0.87 |
| CIE values |  |  |
| L | 80.2 | 82.6 |
| a | −3.4 | −5.0 |
| b | 56.7 | 54.5 |
| Yellowness Index | 86.9 | 81.9 |
| % transmittance at 550 nm | 56.7 | 51.5 |
| % haze | 2.0 | 1.6 |

The examples collectively show that the compositions comprising acidic additives provide substantial reductions in mold release pressure and increases in melt flow compared to compositions lacking the acidic additives. These advantages are achieved without significantly compromising other important physical properties.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A resin composition, comprising:

about 50 to about 99.99 weight percent of a polyetherimide resin; and at least 0.01 weight percent of an acidic additive selected from the group consisting of aliphatic carboxylic acids having a vapor pressure less than one atmosphere at 300° C., aromatic carboxylic acids having a vapor pressure less than one atmosphere at 300° C., and combinations thereof;

wherein the composition after molding has a percent transmittance of at least about 50 percent, measured at a thickness of one-eighth inch according to ASTM D1003.

2. The resin composition of claim 1, wherein the polyetherimide resin comprises structural units of the formula (I):

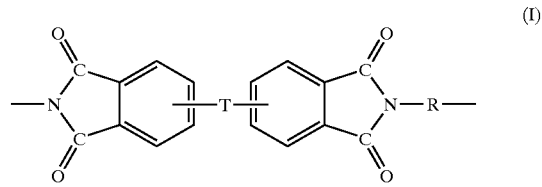

(I)

wherein the divalent T moiety bridges the 3,3', 3,4', 4,3', or 4,4' positions of the aryl rings of the respective aryl imide moieties of formula (I); T is —O— or a group of the formula —O—Z—O—; Z is a divalent radical selected from the group consisting of formulae (II):

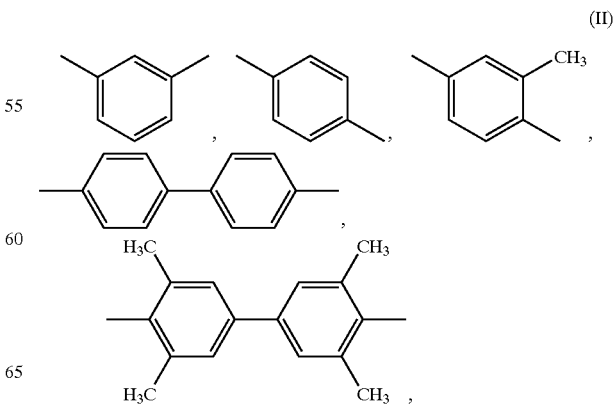

(II)

-continued

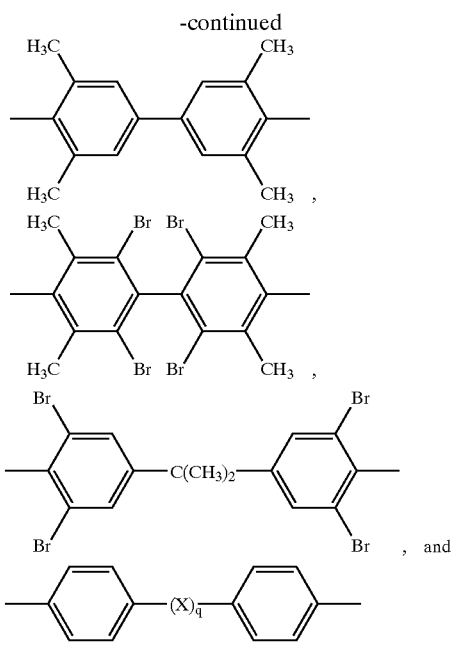

wherein X is a member selected from the group consisting of divalent radicals of the formulae (III):

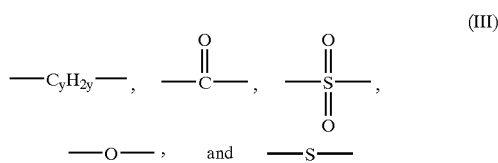

(III)

wherein y is an integer from 1 to about 5, and q is 0 or 1; R is a divalent organic radical selected from the group consisting of: (a) aromatic hydrocarbon radicals having from 6 to about 20 carbon atoms and halogenated derivatives thereof, (b) alkylene radicals having from 2 to about 20 carbon atoms, (c) cycloalkylene radicals having from 3 to about 20 carbon atoms, and (d) divalent radicals of the general formula (IV):

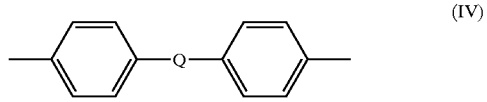

(IV)

where Q is a covalent bond or a member selected from the group consisting of formulae (V):

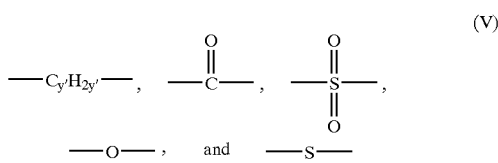

(V)

where y' is 1 to 5.

3. The resin composition of claim 1, wherein the polyetherimide resin is the reaction product formed by melt polymerization of 2,2-bis[4-(3,4-dicarboxyphenoxy)phenyl] propane dianhydride with one or more of paraphenylene diamine and metaphenylene diamine.

4. The resin composition of claim 1, wherein the composition comprises the aliphatic carboxylic acid.

5. The resin composition of claim 4, wherein the aliphatic carboxylic acid has a vapor pressure less than one atmosphere at 325° C.

6. The resin composition of claim 4, wherein the aliphatic carboxylic acid has the structure (VII)

$$R\text{—}(CO_2H)_n \qquad (VII)$$

wherein R is an unsubstituted aliphatic hydrocarbon radical or a substituted aliphatic hydrocarbon radical comprising one or more substituents selected from the group consisting of $C_1$–$C_{18}$ alkoxy, $C_6$–$C_{18}$ aryl, $C_6$–$C_{18}$ aryloxy, nitro, halogeno. hydroxy, amino, amido, and alkoxycarbonyl; and n is 1 to about 6.

7. The resin composition of claim 6, wherein n is 1 or 2.

8. The resin composition of claim 6, wherein n is 1.

9. The resin composition of claim 6, wherein R is a substituted saturated aliphatic hydrocarbon radical, or an unsubstituted saturated aliphatic hydrocarbon radical comprising one or more substituents selected from the group consisting of $C_1$–$C_{18}$ alkoxy, $C_6$–$C_{18}$ aryl, $C_6$–$C_{18}$ aryloxy, nitro, halogeno, hydroxy, amino, amido, and alkoxycarbonyl.

10. The resin composition of claim 4, wherein the aliphatic carboxylic acid is a saturated aliphatic monocarboxylic acid.

11. The resin composition of claim 10, wherein the saturated aliphatic monocarboxylic acid has about 12 to about 36 carbon atoms.

12. The resin composition of claim 4, wherein the aliphatic carboxylic acid is selected from the group consisting of tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentriacontanoic acid, dotriacontanoic acid, tritriacontanoic acid, tetratriacontanoic acid, pentatriacontanoic acid, hexatriacontanoic acid, 1,5-heptanedioic acid, 1,6-hexandioic acid, 1,7-heptanedioic acid, 1,8-octanedioic acid, 1,9-nonanedioic acid, 1,10-decanedioic acid, 1,11-undecanedioic acid, 1,12-dodecanedioic acid, 1,13-tridecanedioic acid, 1,14-tetradecanedioic acid, 1,15-pentadecanedioic acid, 1,16-hexadecanedioic acid, 1,17-heptadecanedioic acid, 1,18-octadecanedioic acid, 1,3-cyclohexanedicarboxylic acid, 1,4-cyclohexanedicarboxylic acid, palmitoleic acid, oleic acid, linolenic acid, cetoleic acid, p-phenylenediacetic acid, and combinations thereof.

13. The resin composition of claim 4, wherein the aliphatic carboxylic acid is a saturated aliphatic monocarboxylic acid selected from the group consisting of tridecanoic acid, tetradecanoic acid, pentadecanoic acid, hexadecanoic acid, heptadecanoic acid, octadecanoic acid, nonadecanoic acid, eicosanoic acid, heneicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, hentriacontanoic acid, dotriacontanoic acid, tritriacontanoic acid, tetratriacontanoic acid, pentatriacontanoic acid, hexatriacontanoic acid, and combinations thereof.

14. The resin composition of claim 4, wherein the aliphatic carboxylic acid is a saturated aliphatic monocarboxylic acid selected from the group consisting of hexadecanoic acid, octadecanoic acid, eicosanoic acid, docosanoic acid, tetracosanoic acid, and combinations thereof.

15. The resin composition of claim 4, wherein the aliphatic carboxylic acid is octadecanoic acid.

16. The resin composition of claim 1, wherein the composition comprises the aromatic carboxylic acid.

17. The resin composition of claim 16, wherein the aromatic carboxylic acid has a vapor pressure less than one atmosphere at 325° C.

18. The resin composition of claim 16, wherein the aromatic carboxylic acid has the structure (VIII)

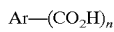  (VIII)

wherein Ar is an unsubstituted aromatic hydrocarbon radical, or a substituted aromatic hydrocarbon radical comprising one or more substituents selected from the group consisting of $C_1$–$C_{18}$ alkyl, $C_1$–$C_{18}$ alkoxy, nitro, halogeno, hydroxy, amino, amido, and alkoxycarbonyl; and n is 1 to about 6.

19. The resin composition of claim 18, wherein n is 1 or 2.

20. The resin composition of claim 18, wherein n is 1.

21. The resin composition of claim 16, wherein the aromatic carboxylic acid has about 8 to about 36 carbon atoms.

22. The resin composition of claim 16, wherein the aromatic carboxylic acid is selected from the group consisting of structures (IX)

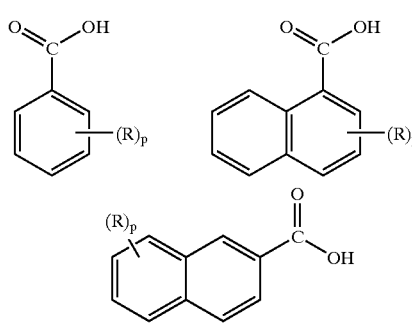

wherein each R is independently $C_1$–$C_{18}$ alkyl, $C_1$–$C_{18}$ alkoxy, nitro, amino, halogeno, or hydroxy; and p is 1 to 5 for substituted benzoic acids or 1 to 7 for substituted naphthoic acids.

23. The resin composition of claim 16, wherein the aromatic carboxylic acid is selected from the group consisting of phthalic acid, isophthalic acid, terephthalic acid, 2-aminobenzoic acid, 3-aminobenzoic acid, 4-aminobenzoic acid, 1,2,4-benzenetricarboxylic acid, 1,3,5-benzenetricarboxylic acid, 1,2,4,5-benzenetetracarboxylic acid, 4-phenylbenzoic acid, 2-hydroxy-1-naphthoic acid, 3-hydroxy-1-naphthoic acid, 4-hydroxy-1-naphthoicacid, 5-hydroxy-1-naphthoic acid, 6-hydroxy-1-naphthoic acid, 7-hydroxy-1-naphthoic acid, 8-hydroxy-1-naphthoic acid, 1-hydroxy-2-naphthoic acid, 3-hydroxy-2-naphthoic acid, 4-hydroxy-2-naphthoic acid, 5-hydroxy-2-naphthoic acid, 6-hydroxy-2-naphthoic acid, 7-hydroxy-2-naphthoic acid, 8-hydroxy-2-naphthoic acid, 2,2'-biphenyldicarboxylic acid, 4,4'-biphenyldicarboxylic acid, 4,4'-oxybisbenzoic acid, and mixtures thereof.

24. The resin composition of claim 1, comprising 0.01 to about 4 weight percent of the acidic additive, based on the total weight of the composition.

25. The resin composition of claim 1, further comprising up to about 50 weight percent, based on the total weight of the composition, of a resin selected from the group consisting of polycarbonates, polyestercarbonates, polyesters, polyarylates, polyetherketones, polyketones and combinations thereof.

26. The resin composition of claim 1, further comprising a polyester resin.

27. The resin composition of claim 26, wherein the polyester resin comprises repeating units of the formula (XII)

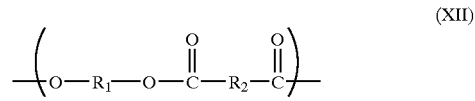

wherein each $R_1$ and $R_2$ is independently a divalent acyclic hydrocarbon radical, a divalent alicyclic hydrocarbon radical, or a divalent aromatic hydrocarbon radical.

28. The resin composition of claim 26, wherein the polyester resin comprises a polyethylene terephthalate resin.

29. The resin composition of claim 26, comprising about 1 to about 30 weight percent of the polyester resin, based on the total weight of the composition.

30. The resin composition of claim 1, further comprising an additive selected from the group consisting of antioxidants, flame retardants, drip retardants, dyes, colorants, stabilizers, antistatic agents, plasticizers, lubricants, and combinations thereof.

31. The resin composition of claim 1, farther comprising a phosphorus-containing stabilizer having the formula (XIII)

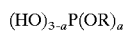  (XIII)

where each R is independently $C_1$–$C_{18}$ alkyl, $C_6$–$C_{18}$ aryl, $C_7$–$C_{18}$ is alkylaryl, or $C_7$–$C_{18}$ aralkyl; and a is 0, 1, 2, or 3.

32. The resin composition of claim 31, wherein the phosphorus-containing stabilizer is selected from the group consisting of the reaction product of phosphorus trichloride with 1,1-biphenyl and 2,4-t-butylphenol; sodium phenyl phosphonate; di-tert-butyl phenyl phosphite; and combinations thereof.

33. The resin composition of claim 1, wherein the composition is substantially free of carbon fibers.

34. The resin composition of claim 1, wherein the composition after molding has a yellowness index less than 70 measured at one-eighth inch thickness according to ASTM D1925.

35. The resin composition of claim 1, wherein the composition after molding has a flexural modulus of at least 300 kilopounds per square inch, measured at 23° C. according to ASTM D790.

36. The resin composition of claim 1, wherein the composition after molding has a reverse notched Izod impact strength of at least about 10 foot-pounds per inch, measured at 23° C. according to ASTM D256.

37. A resin composition, comprising:
   about 96 to about 99.95 weight percent of a polyetherimide; and
   about 0.05 to about 4 weight percent of an acidic additive selected from the group consisting of aliphatic carboxylic acids having a vapor pressure less than one atmosphere at 300° C., aromatic carboxylic acids having a vapor pressure less than one atmosphere at 300° C., and combinations thereof.

38. A resin composition, comprising:
   about 98 to about 99.95 weight percent of a polyetherimide; and
   about 0.05 to about 2 weight percent of octadecanoic acid.

39. A resin composition, comprising:

about 70 to about 98.95 weight percent of a polyetherimide;

about 1 to about 30 weight percent of a polyester resin; and about 0.05 to about 2 weight percent of an acidic additive selected from the group consisting of aliphatic carboxylic acids having a vapor pressure less than one atmosphere at 300° C., aromatic carboxylic acids having a vapor pressure less than one atmosphere at 300° C., and combinations thereof;

wherein the composition after molding has a percent transmittance of at least about 50 percent, measured at a thickness of one-eighth inch according to ASTM D1003.

40. A resin composition, comprising:

about 70 to about 98.95 weight percent of a polyetherimide;

about 1 to about 30 weight percent of a polyester resin; and about 0.05 to about 2 weight percent of octadecanoic acid wherein the composition after molding has a percent transmittance of at least about 50 percent, measured at a thickness of one-eighth inch according to ASTM D1003.

41. A resin composition, comprising the reaction product of:

a polyetherimide resin; and about 0.05 to about 4 weight percent of an acidic additive selected from the group consisting of aliphatic carboxylic acids having a vapor pressure less than one atmosphere at 300° C., aromatic carboxylic acids having a vapor pressure less than one atmosphere at 300° C., and combinations thereof;

wherein the composition after molding has a percent transmittance of at least about 50 percent, measured at a thickness of one-eighth inch according to ASTM D1003.

42. An article comprising of the resin composition of claim 1.

43. An article comprising the resin composition of claim 41.

44. A method of preparing a resin composition having a percent transmittance after molding of at least about 50 percent measured at a thickness of one-eighth inch according to ASTM D1003, the composition comprising:

blending about 50 to about 99.99 weight percent of a polyetherimide resin and at least 0.01 weight percent of an acidic additive selected from the group consisting of aliphatic carboxylic acids having a vapor pressure less than one atmosphere at 300° C., aromatic carboxylic acids having a vapor pressure less than one atmosphere at 300° C., and combinations thereof, to form an intimate blend.

45. The resin composition of claim 1, having a melt index of 2.2 to 5.02 grams/10 minutes measured at 337° C. and 6.6 kilograms load according to ASTM D1238.

* * * * *